United States Patent [19]

Takiguchi

[11] Patent Number: 5,231,321
[45] Date of Patent: Jul. 27, 1993

[54] NOISE PREVENTING ARRANGEMENT OF A MOTOR

[75] Inventor: Masahiro Takiguchi, Kosai, Japan
[73] Assignee: Asmo Co., Ltd., Kosai, Japan
[21] Appl. No.: 892,408
[22] Filed: Jun. 1, 1992

Related U.S. Application Data

[63] Continuation of Ser. No. 568,876, Aug. 17, 1990, abandoned.

[30] Foreign Application Priority Data

Aug. 28, 1989 [JP] Japan .................. 1-220608

[51] Int. Cl.⁵ .............. H02K 5/24; H02K 11/00; H05K 5/03
[52] U.S. Cl. .................. 310/51; 310/68 R; 361/394
[58] Field of Search ........... 310/51, 220-224, 310/68 R; 361/212, 221, 392, 394, 395, 399

[56] References Cited

U.S. PATENT DOCUMENTS

| | | | |
|---|---|---|---|
| 2,692,372 | 10/1954 | Goldstine | 333/79 |
| 3,048,722 | 8/1962 | Baron | 310/72 |
| 4,158,787 | 6/1979 | Forward | 310/51 |
| 4,323,804 | 4/1982 | Zelt | 310/72 |
| 4,342,934 | 8/1982 | van Wijhe et al. | 310/239 |
| 4,429,241 | 1/1984 | Ohara et al. | 310/51 |
| 4,442,367 | 4/1984 | Suzuki | 310/91 |
| 4,550,268 | 10/1985 | Becker et al. | 310/239 |
| 4,619,591 | 10/1986 | Iwai et al. | 417/422 |
| 4,727,274 | 2/1988 | Adam et al. | 310/239 |
| 4,748,356 | 5/1988 | Okashiro et al. | 310/72 |
| 4,760,357 | 7/1988 | Yamaguchi | 333/181 |
| 4,764,684 | 8/1988 | Fiorina et al. | 307/66 |
| 4,795,951 | 1/1989 | Gaebel et al. | 318/293 |
| 4,811,168 | 3/1989 | Chesnut et al. | 361/399 |
| 4,845,393 | 7/1989 | Burgess et al. | 310/51 |
| 4,900,966 | 2/1990 | Winter et al. | 310/239 |

FOREIGN PATENT DOCUMENTS

| | | |
|---|---|---|
| 8906875 | 7/1989 | European Pat. Off. . |
| 2813956 | 4/1979 | Fed. Rep. of Germany . |
| 61-138352 | 8/1986 | Japan . |
| 2186439 | 8/1987 | United Kingdom . |

Primary Examiner—Steven L. Stephan
Assistant Examiner—D. R. Haszko
Attorney, Agent, or Firm—Burns, Doane, Swecker & Mathis

[57] ABSTRACT

The present invention provides an arrangement of a motor intended to prevent transmission of vibrations, i.e., noises between a noise preventing circuit and the motor. The noise preventing circuit is formed into a unit, thereby realizing simple and automatic installation thereof into the motor without giving influences upon the vibration preventing structure of brushes. According to the arrangement, the noise preventing circuit may not be used and the specifications thereof may be easily changed.

10 Claims, 9 Drawing Sheets

NOISE PREVENTING ARRANGEMENT OF A MOTOR

This application is a continuation application of application Ser. No. 07/568,876, filed Aug. 17, 1990 now abandoned.

BACKGROUND OF THE INVENTION

1. Field of the Invention

The present invention generally relates to an arrangement of a motor designed to prevent generation of noises, and more particularly, to an arrangement of a motor wherein a noise preventing circuit is formed in a unit and rendered readily accommodatable within the motor.

2. Description of the Prior Art

Figure 20:
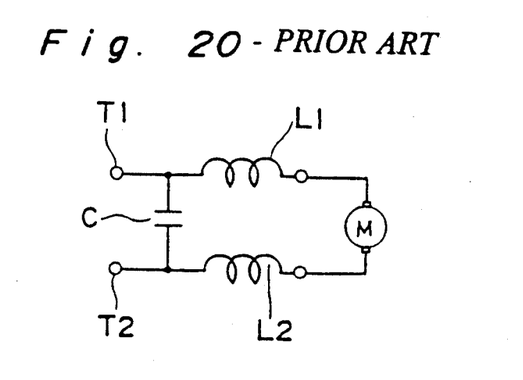
FIG. 20 is an example of a circuit diagram of a noise preventing circuit.

Prevention of electric noises such as leaked from a radio receiver is increasingly required in recent years. Therefore, a noise preventing circuit as shown in FIG. 20 is often added as measures against the noises of the kind referred to above. The noise preventing circuit which functions as a noise preventing element is comprised of a capacitor C and choke coils $L1$ and $L2$ provided between a motor M and terminals $T1$ and $T2$ connected to a power source. The noise preventing circuit is incorporated in the motor in some cases, or is connected outside of the motor.

Since the noise preventing circuit if it is mounted inside the motor takes up space, the circuit is conventionally often connected outside the motor. In such case, however, the circuit is not so much effective because noises are generated between the noise preventing circuit and motor. As such, a method to incorporate the noise preventing circuit in the motor is developed in the trend of research, which is however not satisfactory to meet such demands as possibility of automatic installation thereof in the motor, selective use, or change of specifications as well as prevention of vibrations of a brush.

SUMMARY OF THE INVENTION

An essential object of the present invention is to provide a noise preventing arrangement of a motor, with eliminating the above-described inconveniences inherent in the prior art, whereby:

(1) a noise preventing circuit can be automatically installed inside a motor;

(2) a noise preventing circuit can be incorporated in the motor without affecting the vibration preventing structure of a brush;

(3) use or disuse of the noise preventing circuit can be easily selected; and (4) specifications of the noise preventing circuit can be changed, that is, a capacitor and a choke coil, etc. can be selectively used.

In accomplishing the above-described object, in a noise preventing arrangement of a motor according to the present invention, a casing is provided for a noise preventing unit mounted detachably to an end plate of the motor, into which casing a noise preventing circuit having a noise preventing element comprised of choke coils and/or a capacitor connected to terminals is incorporated in advance, so that the noise preventing circuit is connected to a brush mounted to a brush holder fixed to the end plate, whereby the noise preventing unit is incorporated into the motor.

In another aspect of the present invention, the noise preventing circuit incorporated in the noise preventing unit is connected to the brush via a pigtail not transmitting vibrations, and furthermore, the brush holder and end plate are securely fixed by a lock washer via a vibration-proof bush. In the case, for example, where the brush holder and end plate are integrally formed, a vibration preventing member is provided in an engaging groove of the noise preventing unit to be engaged with the end plate. Accordingly, transmission of vibrations between the brush and noise preventing unit can be perfectly avoided.

In a further aspect of the present invention, the noise preventing unit is provided with a connection terminal at the side of the brush coupled to the noise preventing circuit, and moreover a coupling electrode which is to be connected to the above connection terminal when the noise preventing unit is mounted to the end plate of the motor is printed on the brush holder. Accordingly, the coupling electrode is connected to the brush held by the brush holder.

In a still aspect further of the present invention, the noise preventing circuit in the noise preventing unit is provided with a choke coil and a capacitor, or only a choke coil or only a capacitor depending on the kind of the motor or the like, thereby achieving change of specifications of the noise preventing circuit. At the same time, the arrangement of the present invention can dispense with a noise preventing circuit not using both the choke coil and the capacitor. The manner how the noise preventing unit is mounted in the motor is not changed even in the case of changing the specification of the noise preventing circuit.

In a still further aspect of the present invention, the noise preventing circuit can be mounted in the noise preventing unit simply by being pressed from one direction. Moreover, a protecting cover can be mounted only by being pressed from the same one direction after the noise preventing circuit is mounted. The noise preventing unit is securely fixed only by being fitted into the end plate from one direction.

Because of the above-described arrangement, according to the present invention, the noise preventing circuit is remarkably simply and automatically incorporated into the motor. Since the noise preventing unit and brush are connected in a manner not to permit transmission of vibrations therebetween, the noise preventing circuit can be incorporated into the motor without giving influences upon the vibration preventing structure of the brush. Moreover, it is easy to change and select noise preventing elements of the noise preventing circuit, so that the use or disuse of the noise preventing circuit can be easily selected and the change of specifications thereof can be readily achieved.

BRIEF DESCRIPTION OF THE DRAWINGS

This and other objects and features of the present invention will become apparent from the following description taken in conjunction with preferred embodiments thereof with reference to the accompanying drawings, in which:

FIG. 8a is a view showing one example of how a noise preventing circuit is assembled;

FIG. 8b is a circuit diagram of FIG. 8a;

FIG. 9a is a view showing the other example of how the noise preventing circuit is assembled;

FIG. 9b is a circuit diagram of FIG. 9a;

FIG. 10a is a view showing a further example of how the noise preventing circuit is assembled;

FIG. 10b is a circuit diagram of FIG. 10a;

FIG. 11a is a view showing one example when the noise preventing circuit is not provided;

FIG. 11b is a circuit diagram of FIG. 11a;

FIG. 15b is a side sectional view of FIG. 15a;

FIG. 16b is a circuit diagram of FIG. 16a;

FIG. 17a is a front elevational view of a noise preventing unit according to a fourth embodiment of the present invention;

FIG. 17b is a circuit diagram of FIG. 17a;

FIG. 18 is a view similar to FIG. 1 according to a fifth embodiment of the present invention;

DETAILED DESCRIPTION OF PREFERRED EMBODIMENTS

Before the description of the present invention proceeds, it is to be noted here that like parts are designated by like reference numerals throughout the accompanying drawings.

Figure 1:
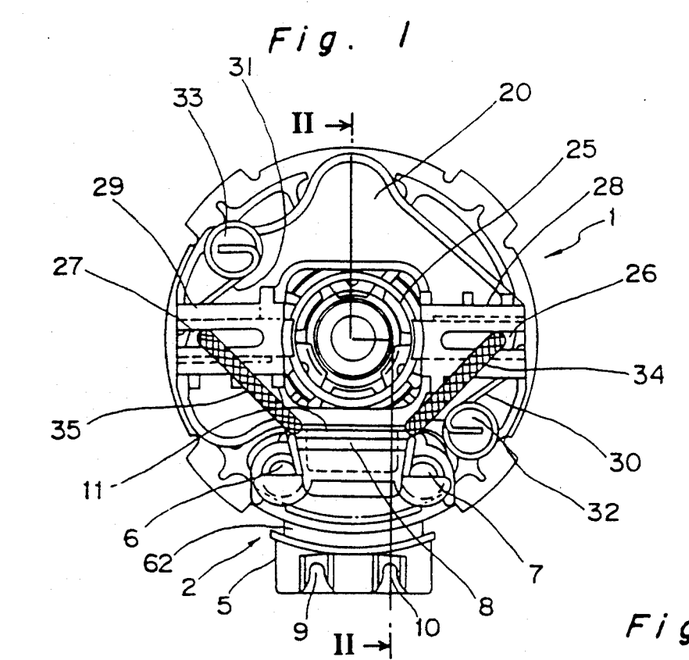
FIG. 1 is a front elevational view of a part of a motor having a noise preventing unit incorporated therein according to a first embodiment of the present invention.
Figure 2:
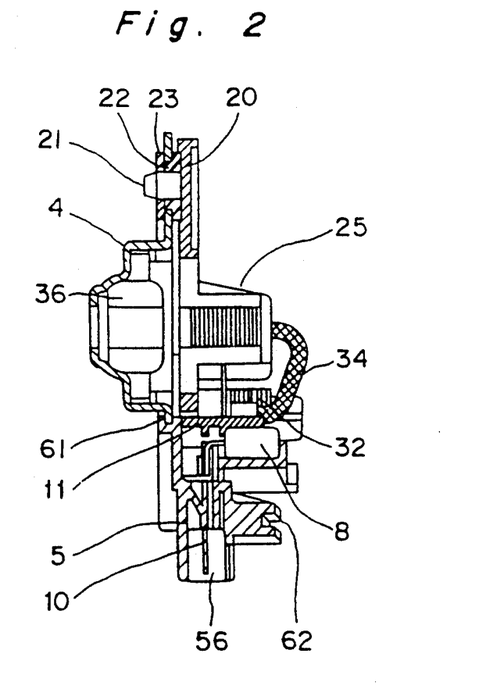
FIG. 2 is a cross sectional view taken along the line II—II of FIG. 1.
Figure 3:
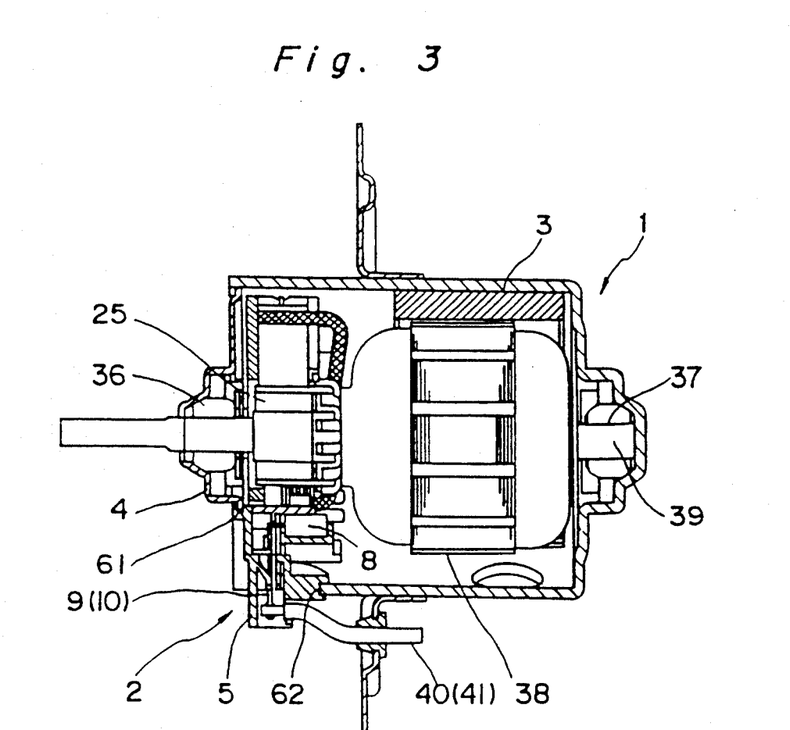
FIG. 3 is a side sectional view of FIG. 1.
Figure 4:
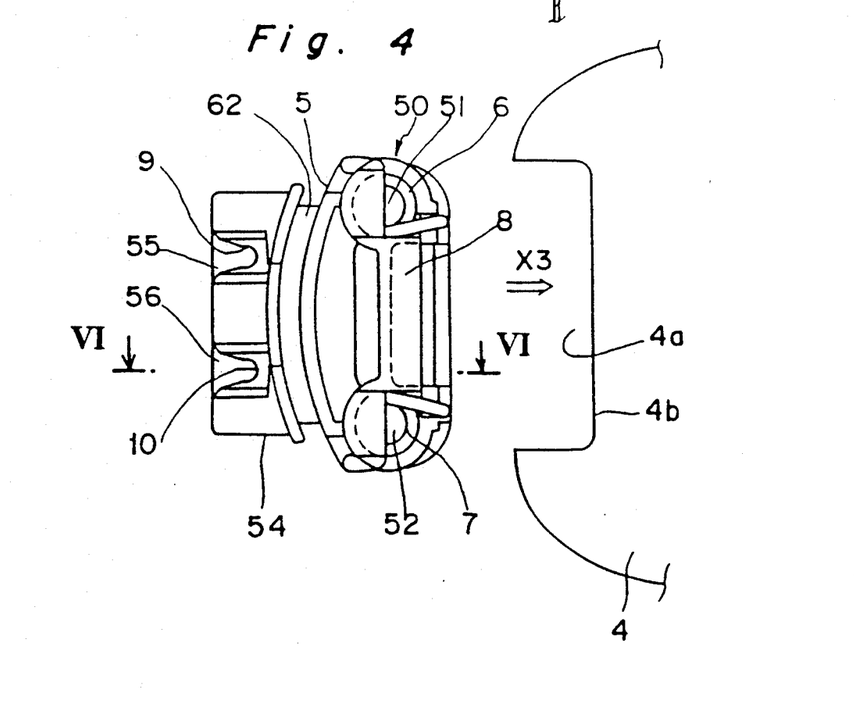
FIG. 4 is a front elevational view of the noise preventing unit.
Figure 5:
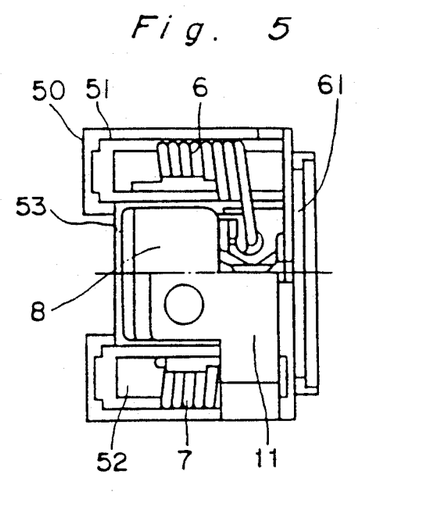
FIG. 5 is a side sectional view of FIG. 4.
Figure 6:
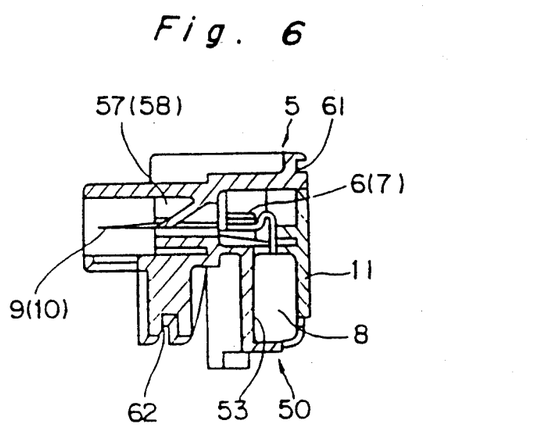
FIG. 6 is a cross sectional view taken along the line VI—VI of FIG. 4.
Figure 7:
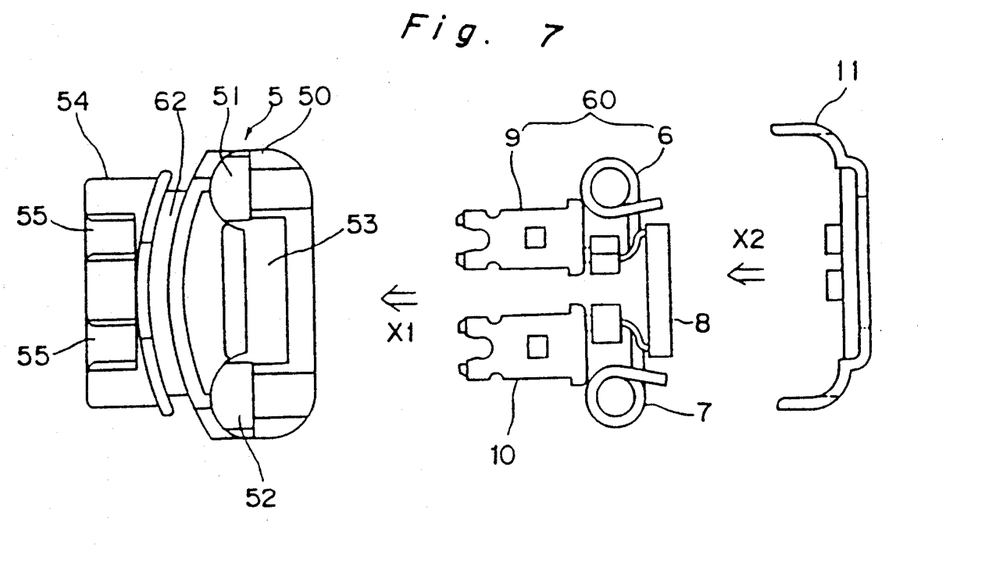
FIG. 7 is a view showing a process for mounting the noise preventing unit.

Referring to FIGS. 1-3, there is indicated a motor 1 having a noise preventing unit 2 incorporated therein. The noise preventing unit 2 is detachably fixed to an end plate 4 in the interior enclosed by a motor housing 3 and the end plate 4 mounted at an opening end of the housing 3.

The noise preventing unit 2 is in such a structure as shown in FIGS. 4-7. Specifically, the noise preventing unit 2 is comprised of a casing 5 made of an insulative body in the shape shown in the drawings, choke coils 6 and 7, a capacitor 8, terminals 9 and 10, and a protecting cover 11. The choke coils 6 and 7, capacitor 8 and terminals 9 and 10 are all detachably mounted to the casing 5. The protecting cover 11 is mounted to the casing 5 so as to avoid shortcircuiting of the components 6-10.

Figures 8A, 8B:
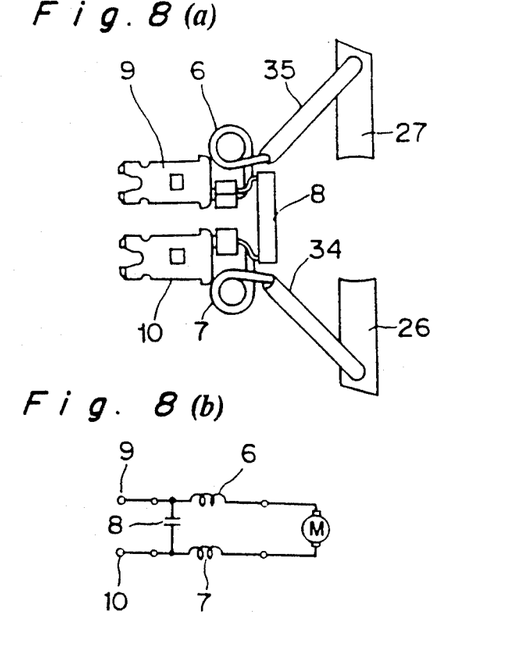
Figures 9A, 9B:
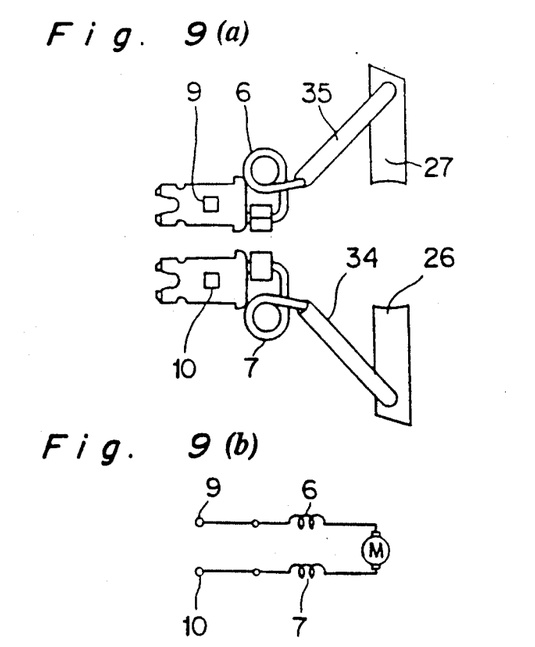
Figures 10A, 10B:
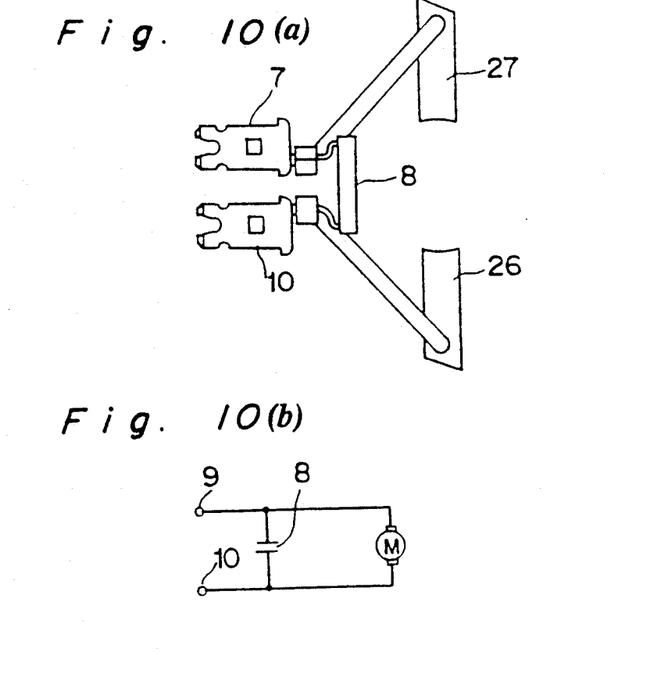
Figures 11A, 11B:
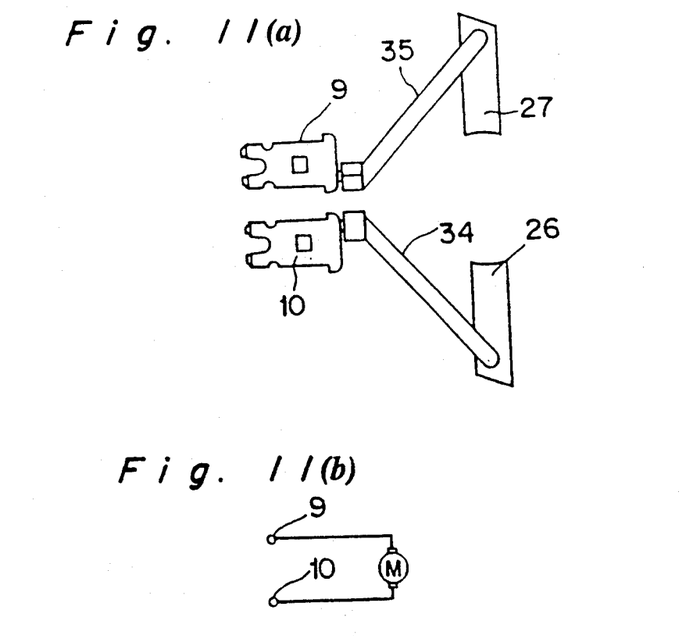

The casing 5 has a part 50 which is detachably engaged with a rectangular recess 4a notched in a part of an outer periphery of the end plate 4. At an end of a substrate of the part 50 where a noise preventing circuit is mounted, there are formed an engaging groove 61 into which a front edge 4b of the recess 4a is held, and an engaging groove 62 which is engaged with a yoke 3a of the housing 3. A pair of housing parts 51 and 52 in a semi-cylindrical shape are also provided in the mounting part 50 to accommodate the choke coils therein. At the same time, an opening section 53 is defined between the housing parts 51 and 52 so as to accommodate the capacitor. The casing 5 is integrally formed with a terminal connecting unit 54 from the outer periphery of the mounting part 50. The terminal connecting unit 54 has a pair of terminal connecting ports 55 and 56 opened at the outer surface of the unit 54. These connecting ports 55 and 56, passing through the interior of the casing 5, communicate with terminal mounting parts 57 and 58 opened to the inner surface of the noise preventing circuit mounting part 50. As shown in FIG. 8, the terminals 9 and 10 to be mounted to the terminal mounting parts 57 and 58, choke coils 6 and 7 to be accommodated in the housing parts 51 and 52 and capacitor 8 to be housed in the opening section 53 are preliminarily connected as a circuit unit 60. This circuit unit 60 is pressed into the casing 5 from a direction shown by an arrow X1, so that the circuit 60 is detachably mounted to the casing 5. Thereafter, the protecting cover 11 is pressed to the casing 5 from the same direction shown by an arrow X2. As a result, the noise preventing unit 2 is integrally assembled. When the noise preventing unit 2 is inserted into the recess 4a of the end plate 4 from a direction shown by an arrow X3 in FIG. 4, and the engaging groove 61 is engaged with the front edge 4b of the end plate 4, the noise preventing unit 2 is positioned in a back-and-forth and a left-and-right directions and detachably fixed.

The end plate 4 to which is fixed the noise preventing unit 2 has a brush holder 20, as indicated in FIGS. 1-3, fixed at three points by a lock washer 21. In mounting the brush holder 20, a bush 22 having vibration preventing property is intervened between the brush holder 20 and end plate 4. At the same time, the end plate 4 is held between the bush 22 and an outer bush 23. Accordingly, vibrations of the brush holder 20 are hardly transmitted to the end plate 4.

A commutator 25 stands at the central part of the brush holder 20 between brush guides 28 and 29 which respectively slidably hold brushes 26 and 27. Further, spring retainers 32 and 33 are provided in the lateral of the brush guides 28 and 29 to mount springs 30 and 31 which urge the brushes. The pair of the brushes 26 and 27 inserted to the brush guides 28 and 29 of the brush holder 20 from respective outer openings of the guides are connected in advance with the above-described choke coils 6 and 7 via pigtails 34 and 35. The brushes 26 and 27 are therefore integrally assembled with the circuit unit 60 of the noise preventing unit 2 through the pigtails 34 and 45. After these brushes 26 and 27 are inserted into the brush guides, the outer end faces of the brush guides are urged by the springs 30 and 31, thereby letting the inner end faces of the guides pressed in contact with the commutator 25. Accordingly, the brushes 26 and 27 are connected to the choke coils 6 and 7 of the noise preventing unit 2 via the pigtails 34 and 35 without transmission of vibrations.

As described hereinabove, after the noise preventing unit 2 and brush holder 20 are secured to the end plate 4, the end plate 4 is placed at an opening of the housing 3 so that a shaft 39 of an armature 38 is supported by bearing parts 36 and 37 provided in the end plate 4 and housing 3, respectively. Then, the end plate 4 is secured to the housing 3. At this time, the engaging groove 62 formed in the casing 5 of the unit 2 are securely engaged to a corresponding end part of the housing 3. In the state where the noise preventing unit 2 is incorporated in the motor 1 as in the above-described manner, the terminal connecting part 54 of the unit 2 projects outside of the housing 3, with the terminals 9 and 10 within the connecting ports 55 and 56 being connected to lead wires 40 and 41. The lead wires 40 and 41 are sequentially connected to the terminals 9 and 10 choke coils 6 and 7 (capacitor 8 is intervened between the chokes 6 and 7) pigtails 34 and 35 brushes 26 and 27, so that a driving voltage is applied along this route to actuate the motor.

In the structure as above, the circuit unit 60 which is comprised of the choke coils 6 and 7 and capacitor 8 formed in one unit is intervened between the terminals 9 and 10 connected to the brushes 26 and 27. Moreover, the noise preventing unit 2 is easily mounted through engagement with the end plate 4 and housing 3. Therefore, the noise preventing unit can be incorporated into the motor in a simple manner. In addition, the noise preventing unit 2 can be assembled with the circuit unit 60 and protecting cover 11 simply by pressing these unit 60 and cover 11 one by one to the casing 5 from the same direction. Accordingly, the noise preventing unit 2 can be assembled and moreover incorporated into the motor automatically.

The noise preventing unit 2 is fixed to the end plate 4 which is fixed t the brush holder 20 through vibration preventing bushes 22 and 23. The noise preventing unit 2 is connected to the brushes 26 and 27 through the pigtails 34 and 35. Therefore, vibrations of the brush holder 20 are attenuated by the bushes 22 and 23 and pigtails 34 and 35, and accordingly hardly transmitted to the end plate 4 and noise preventing unit 2.

Meanwhile, when it is not required to prevent noises or specifications of the noise preventing circuit should be changed in accordance with the kind of the motor, it is enough to change the noise preventing elements (choke coils and capacitor) of the circuit unit 60 in the noise preventing unit 2 from as shown in FIG. 9 to FIG. 12, without requiring any change in the mounting process. More specifically, FIGS. 8a and 8b show an example when the choke coils 6 and 7 and capacitor 8 are assembled into the noise preventing circuit 60 as described in the foregoing embodiment. FIGS. 9a and 9b show an example when only the choke coils 6 and 7 are incorporated into the noise preventing circuit 60. Moreover, FIGS. 10a and 10b show an example when only the capacitor 8 is mounted in the noise preventing circuit 60, FIGS. 11a and 11b representing a case where neither choke coils nor capacitor are mounted since the noise preventing circuit is unnecessary. In any case, there is no change in the structure that the casing 5 is fixed to the end plate 4, and engaged with the housing 3. Therefore, no change is encountered in the assembling process of the noise preventing unit into the motor.

Figure 12:
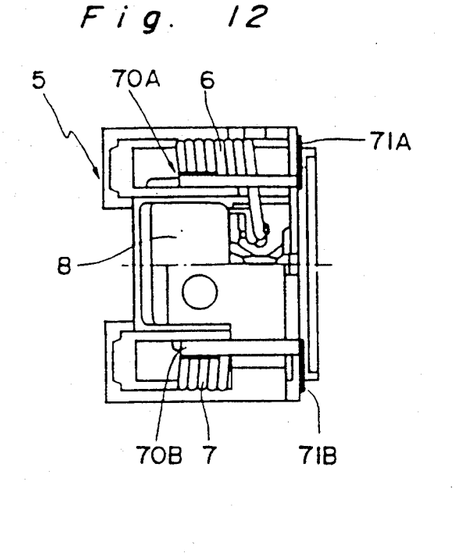
FIG. 12 is a side sectional view of a noise preventing unit according to a second embodiment of the present invention.
Figure 13:
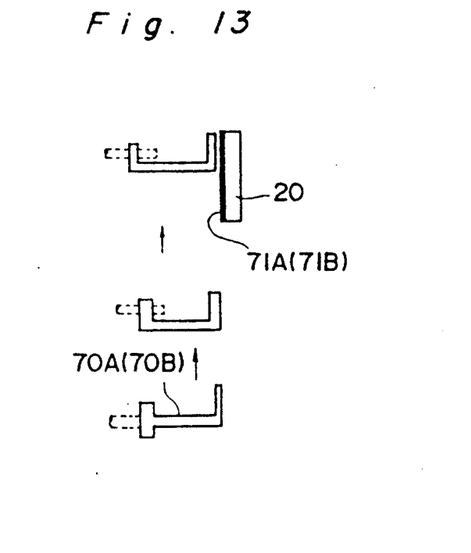
FIG. 13 is a view how a coupling terminal is mounted in the unit of FIG. 12.

The present invention is not restricted to the above-described first embodiment. According to a second embodiment thereof shown in FIGS. 12-14, the noise preventing circuit 60 of the noise preventing unit 2 can be connected to the brushes 26 and 27 only by inserting the unit 2 into the end plate 4.

Figure 14:
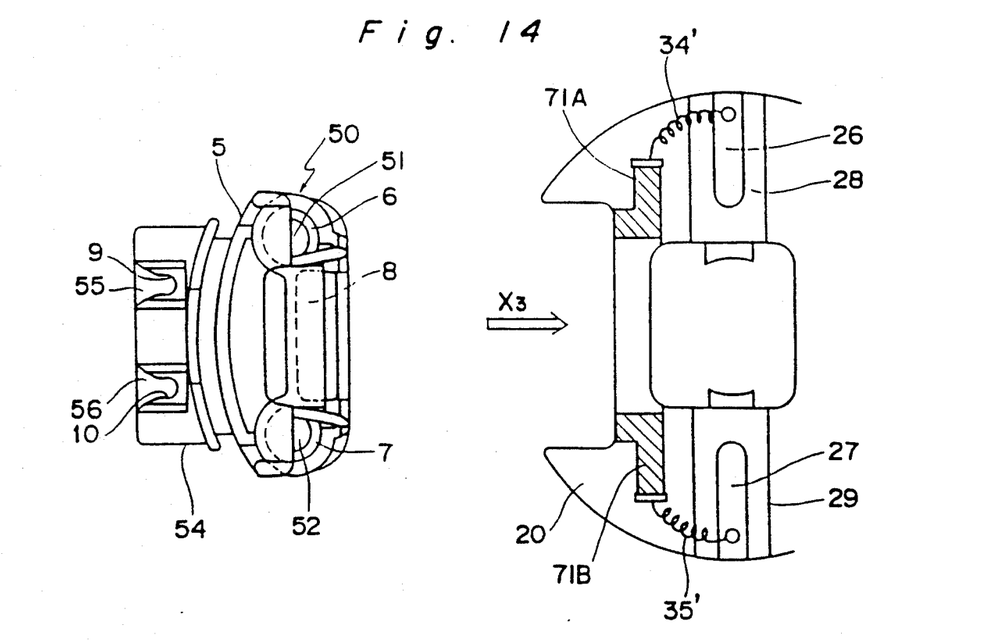
FIG. 14 is a view showing the relation between the noise preventing unit of FIG. 12 and a brush holder.
Figure 15A:
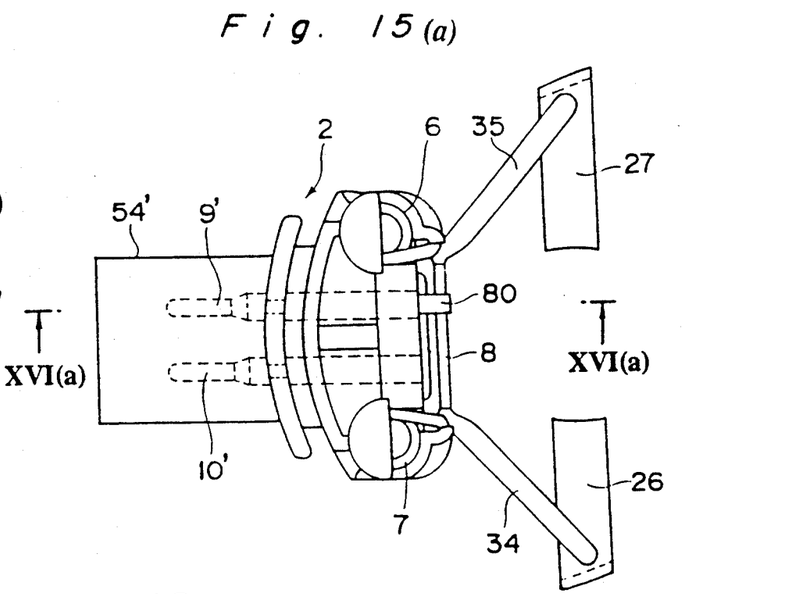
FIG. 15a is a front elevational view of a noise preventing unit according to a third embodiment of the present invention.
Figure 15B:
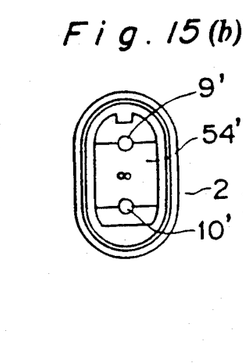
Figure 16A:
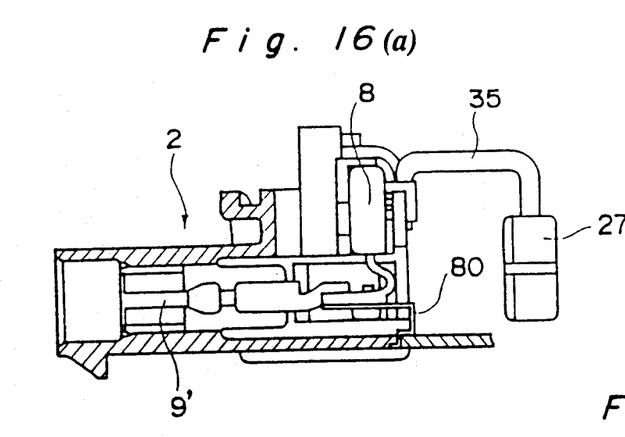
FIG. 16a is a cross sectional view taken along the line XVIa—XVIa.
Figure 16B:
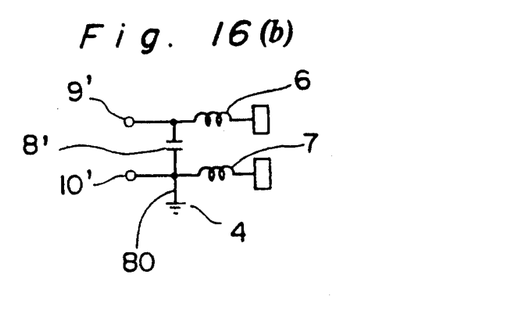

In other words, the choke coils 6 and 7 of the circuit 60 are caulked to coupling terminals 70A and 70B, thereby realizing connection of the circuit 60 with the choke coils. On the other hand, the brush holder 20 has coupling electrodes 71A and 71B printed as indicated in FIG. 14. The coupling electrodes are electrically connected to the above-referred coupling terminals 70A and 70B when the noise preventing unit 2 is inserted into the end plate 4 which securely supports the brush holder 20. Moreover, these coupling electrodes 71A and 71B are connected in advance to the brushes 26 and 27 via pigtails 34' and 35'.

In the modified embodiment described hereinabove, it is not necessary to preliminarily connect the noise preventing circuit 60 with the brushes 26 and 27.

The noise preventing unit 2 according to the present invention becomes able to be directly connected to an external connector if the shape of the casing 5 and terminals 9 and 10 is changed. That is, according to a third embodiment shown in FIGS. 15 and 16 and a fourth embodiment shown in FIG. 17, the noise preventing unit 2 is provided with terminals 9' and 10' at an opening in the terminal connecting part 54' so that the unit 2 is directly coupled to the external connector. In the third embodiment, a terminal 80 is further added for earthing which is connected to the noise preventing circuit 60 in the noise preventing unit 2 and also connected to the end plate 4 when the noise preventing unit 2 is coupled to the end plate 4. Likewise, a terminal 81 is connected to the noise preventing circuit 60 in the fourth embodiment, which is connected to the yoke 3a of the housing 3 for earthing.

Figures 17A, 17B, 18:
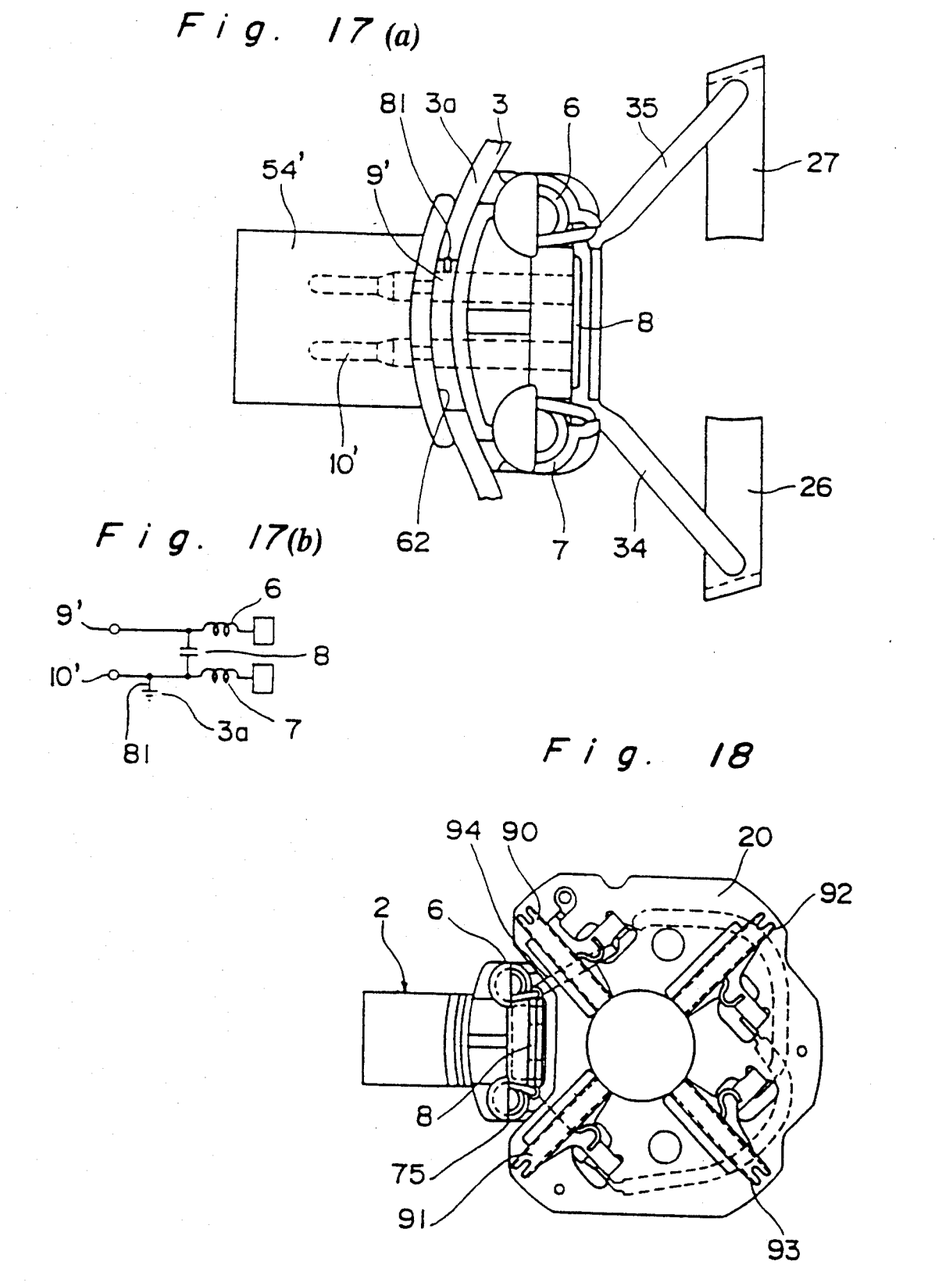

FIG. 18 illustrates a fifth embodiment of the present invention. According to the fifth embodiment, a tetrode motor with tetrode brushes 90, 91, 92 and 93 is buried in the noise preventing unit 2. The choke coils 6 and 7 of the noise preventing unit 2 are connected with the brushes through lead wires 94 and 95.

Figure 19:
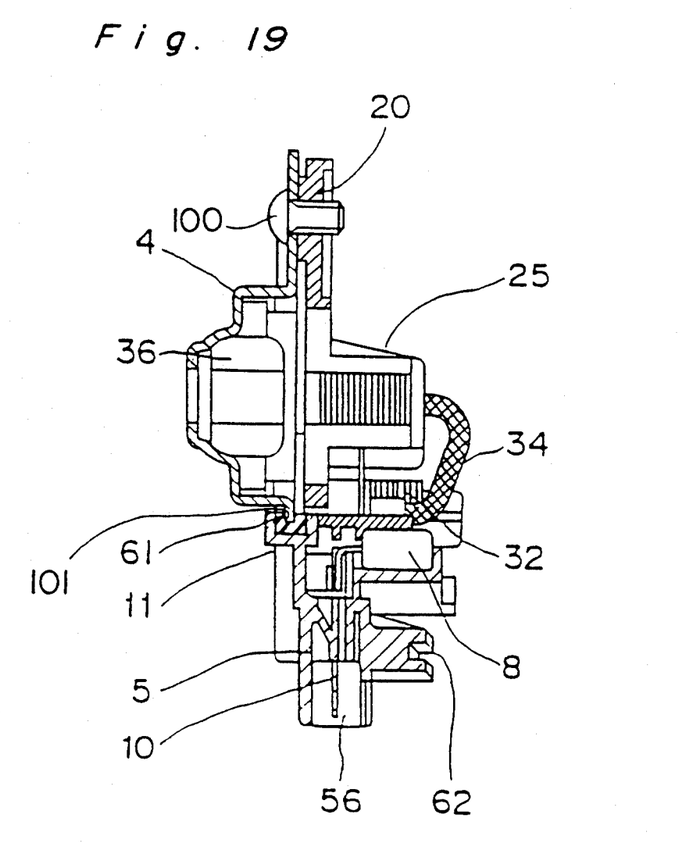
FIG. 19 is a fragmentary sectional view on an enlarged scale showing a sixth embodiment of the present invention.

Referring further to FIG. 19 showing a sixth embodiment of the present invention, the end plate 4 and brush holder 20 are rigidly secured by a screw 100. According to this embodiment, in order to prevent transmission of vibrations from the brush holder 20 to the noise preventing unit 2 through the end plate 4, a vibration preventing member 101 made of rubber is attached to the inner surface of the engaging groove 61 provided in the casing 5 of the unit. The vibration preventing member is provided also when the brush holder 20 is integrally formed with the end plate 4. Accordingly, owing to the vibration preventing member 101 between the end plate 4 and noise preventing unit 2, vibrations of the brushes are prevented from being transmitted to the noise preventing unit through the end plate 4.

It is needless to say that transmission of the vibrations can be effectively prevented if the vibration preventing member is provided in the inner surface of the engaging groove 61 in the first embodiment wherein the brush holder 20 is fixed to the end plate 4 through a vibration preventing mechanism.

As is made clear from the foregoing description of the embodiments, according to the present invention, the noise preventing circuit is formed in a unit, and moreover, the unit is automatically installed into the motor. Accordingly, the noise preventing mechanism can be easily incorporated in the motor. Furthermore, the end plate to which is fixed the noise preventing unit is provided with the brush holder through the vibration preventing mechanism, or the noise preventing unit and end plate are assembled through the noise preventing mechanism. At the same time, the noise preventing circuit in the unit is connected to the brushes via pigtails. Because of this arrangement, the transmission of vibrations between the noise preventing unit and brushes can be almost perfectly prevented, without giving any influence upon the vibration preventing structure of the brushes. Moreover, the noise preventing elements installed in the noise preventing circuit can be selected or can be totally dispensed with. Even when the noise preventing elements are changed, the mounting mechanism thereof into the motor is not changed. Therefore, according to the present invention, the use or disuse of the noise preventing circuit, and the change of specifications of the noise preventing circuit can be easily achieved.

What is claimed is:

1. A noise preventing arrangement of a motor, comprising:
   a housing having an open end;
   an end plate mounted at the open end of the housing;
   a noise preventing unit incorporated into said motor and located within said housing, said noise preventing unit including a casing and a noise preventing circuit;
   said casing including a mounting portion for mounting the noise preventing circuit, a terminal connecting portion for allowing an external power source to be connected to the noise preventing circuit and a first engaging groove positioned between said mounting portion and said terminal connecting portion, said first engaging groove receiving an end part of the housing, said casing including a second engaging groove that is engaged by said end plate;
   said noise preventing circuit being adapted to be received in the mounting portion of the casing, said noise preventing circuit including a choke-coil and a capacitor selectively connected to terminals located at an opening provided in said casing, said choke-coil and said capacitor being individually connectable and disconnectable from said noise preventing circuit;
   a vibration preventing member disposed adjacent the end plate for preventing the transmission of vibration to said noise preventing unit;
   a brush holder fixed to said end plate; and
   brushes mounted on said brush holder and connected to said noise preventing circuit.

2. A noise preventing arrangement of a motor as claimed in claim 1, wherein said end plate to which said noise preventing unit is fixed, is fixed to said brush holder by a lock washer, said vibration preventing member being a brush that is interposed between the end plate and the brush holder, and said noise preventing circuit being connected with said brushes through a set of pigtails, so that transmission of vibrations between said brushes and said noise preventing unit is almost completely prevented.

3. A noise preventing arrangement of a motor as claimed in claim 1, wherein said vibration preventing member is mounted in said second engaging groove, so that transmission of vibrations from said end plate to said noise preventing unit is prevented.

4. A noise preventing arrangement of a motor as claimed in claim 1, wherein a connection terminal is provided in said noise preventing circuit of the noise preventing unit, while a coupling electrode is formed in said brush holder, said connecting terminal being connected with said coupling electrode when said noise preventing unit is mounted to said end plate.

5. A noise preventing arrangement of a motor as claimed in any of claims 1, 2, 3 or 4, wherein said noise preventing circuit of the noise preventing unit is selectively provided with at least one of a choke coil and a capacitor.

6. A noise preventing arrangement as claimed in any of claims 1, 2, 3 or 4, wherein said noise preventing circuit of the noise preventing unit is with only a terminal for connection to an external power source so that said noise preventing circuit is not used since said terminal is connected to said brushes when said noise preventing unit is mounted into the motor.

7. A noise preventing arrangement of a motor as claimed in any of claims 1, 2, 3 or 4, wherein said noise preventing circuit is mounted to said noise preventing unit only by being pressed into said casing from one direction, and a protecting cover is mounted from the same direction after said noise preventing circuit is mounted.

8. A noise preventing arrangement of a motor as claimed in any of claims 1, 2, 3 or 4, wherein said casing of the noise preventing unit is fixedly positioned by being engaged with said end plate of the motor from one direction.

9. A noise preventing arrangement of a motor as claimed in claim 1, wherein said second engaging groove is formed on the mounting portion of the casing.

10. A noise preventing arrangement of a motor as claimed in claim 1, including an opening section and at least one housing part which are formed in the mounting part of the casing, said opening section being adapted to receive the capacitor and said housing part being adapted to receive the choke-coil.

* * * * *